US005969229A

United States Patent [19]

Hori et al.

[11] Patent Number: 5,969,229

[45] **Date of Patent: *Oct. 19, 1999**

[54] LEAD WIRE FOR SENSOR

[75] Inventors: Makoto Hori, Oogaki; Toshimi Miyamoto, Okazaki; Kenji Fukaya, Oobu; Masahiro Hamaya, Anjo; Minoru Ota, Okazaki; Naoto Miwa, Tsushima, all of Japan

[73] Assignee: Nippondenso Co., Ltd., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/717,430

[22] Filed: Sep. 20, 1996

[30] Foreign Application Priority Data

| | | | |
|---|---|---|---|
| Sep. 20, 1995 | [JP] | Japan | 7-267759 |
| Sep. 9, 1996 | [JP] | Japan | 8-261469 |

[51] Int. Cl.$^{6}$ .............................. H01B 5/08; H01B 11/02; G01N 27/26; G01N 27/46

[52] U.S. Cl. ........................ 73/23.31; 73/31.05; 73/23.32; 174/128.1; 174/126.2; 204/424

[58] Field of Search .............................. 174/125.1, 126.1, 174/126.2, 128.1, 128.2, 113 R; 73/23.2, 23.3, 23.31, 23.32, 31.05; 204/424

[56] References Cited

U.S. PATENT DOCUMENTS

| | | | |
|---|---|---|---|
| 294,148 | 2/1884 | Pope | 174/128.1 |
| 1,691,869 | 11/1928 | Fowle | 174/128.1 |
| 3,125,095 | 3/1964 | Kaufman et al. | 174/128.1 |
| 3,231,665 | 1/1966 | Grimes, Jr. et al. | 174/128.1 |
| 3,647,939 | 3/1972 | Schoerner | 174/128.1 |
| 3,676,576 | 7/1972 | Dubernet et al. | 174/113 R |
| 3,795,760 | 3/1974 | Raw et al. | 174/128.1 |
| 4,141,813 | 2/1979 | Kita et al. | 204/195 S |
| 4,284,486 | 8/1981 | Shinohara et al. | 204/195 S |
| 4,591,423 | 5/1986 | Kato et al. | 204/428 |
| 4,717,464 | 1/1988 | Oshima et al. | 204/427 |
| 4,786,398 | 11/1988 | Wertheimer et al. | 204/427 |
| 4,880,519 | 11/1989 | Wang et al. | 204/425 |
| 5,031,445 | 7/1991 | Kato et al. | 73/23.31 |
| 5,036,166 | 7/1991 | Monopoli | 174/128.1 |
| 5,170,015 | 12/1992 | Kudo et al. | 174/128.1 |
| 5,228,975 | 7/1993 | Yamada et al. | 204/424 |
| 5,290,421 | 3/1994 | Reynolds et al. | 204/424 |
| 5,393,397 | 2/1995 | Fukaya et al. | 204/424 |
| 5,490,412 | 2/1996 | Duce et al. | 73/23.31 |
| 5,521,123 | 5/1996 | Komatsu et al. | 437/209 X |
| 5,546,787 | 8/1996 | Häfele et al. | 73/23.31 |
| 5,817,920 | 10/1998 | Kuisell et al. | 73/23.31 |

FOREIGN PATENT DOCUMENTS

| | | |
|---|---|---|
| 56-35656 | 4/1981 | Japan . |
| 61-198047 | 9/1986 | Japan . |
| 63-216207 | 9/1988 | Japan . |
| 64-29717 | 2/1989 | Japan . |
| 4-52887 | 12/1992 | Japan . |

*Primary Examiner*—Hezron Williams
*Assistant Examiner*—J. David Wiggins
*Attorney, Agent, or Firm*—Pillsbury Madison & Sutro LLP

[57] ABSTRACT

A lead wire for a sensor has a conductor unit including at least stainless steel wires and copper wires. By setting the cross-sectional percentage of the stainless steel wires in the conductor unit within the range of 30 to 70%, it is possible to obtain a lead wire having low electrical resistance, and high flexibility, tensile strength and elasticity. There are preferred values in hardness and heat treatment of the stainless steel wires. The copper wires are preferably coated with an antioxidant film. The lead wire may include hybrid wires stranded together and obtained by integrally molding or forming stainless steel and copper. It is preferable that the lead wire is coated with an insulating coating material such as a Teflon type resin.

6 Claims, 6 Drawing Sheets

| | | | | |
|---|---|---|---|---|
| A: | PRESENT EMBODIMENT (MATERIAL No. 8) | SUS 7 WIRES<br>Cu 12 WIRES | PERCENTAGE OF STAINLESS STEEL | 37% |
| B: | COMPARATIVE EXAMPLE (MATERIAL No. 16) | SUS 7 WIRES<br>Cu 4 WIRES | PERCENTAGE OF STAINLESS STEEL | 74% |

LEAD WIRE FOR SENSOR

BACKGROUND OF THE INVENTION

1. Field of the Invention

The present invention relates to a lead wire used for a sensor or detector such as an oxygen concentration sensor or detector.

2. Description of the Prior Art

As the lead wire for an oxygen concentration sensor, a plurality of core wires bundled together have been used in the past. In general, copper is used as the core wires, whereas stainless steel wires are also used in some rare cases. It has also been proposed to use both copper wire and stainless steel wire as lead wires (Japanese Utility Model Publication 4-52887 and Japanese Patent Publication Laid-Open 56-35656).

However, there are the following disadvantages in the conventional type lead wires used for a sensor:

First of all, when copper wires are used for all of the core wires, tensile strength of the lead wire is weak. Also, fatigue caused by bending is high, and elasticity is low. Further, in case the above lead wire is used for a sensor in an automobile, the lead wire may be damaged by pebbles and stones bounced by wheels when the car is driven. On the other hand, to improve tensile strength and elasticity of the lead wire, it has been proposed to reduce diameter of core wire. However, if the wire diameter is reduced too much, the lead wire is more frequently susceptible to damage from external forces and the cost is also extensively increased.

In case stainless steel wire is used for all of the core wires, tensile strength and elasticity of the lead wire are satisfactory, while electrical resistance of the lead wire becomes extremely high. For this reason, it is difficult to use this type of wire as the lead wire for a low-resistance heater. Also, it is difficult to freely bend and arrange the lead wire because its flexibility is low.

In the former of the above Japanese Publications, a lead wire is disclosed, which uses copper wires as core wires and stainless steel wires arranged around the core wires. In this lead wire, the ratio of stainless steel is as high as about 81%. As a result, electrical resistance is high in this type of lead wire, and this adversely affects sensor output or performance of the low-resistance heater. Accordingly, this type of lead wire is inadequate as the lead wire for these purposes.

The latter of the above Japanese Publications discloses a lead wire, which comprises a plurality of bundles of copper wires and stainless steel wires stranded together, but the ratio of stainless steel components is as low as about 22%. As a result, tensile strength is weak although electrical resistance is low.

In addition, sensors are increasingly mounted at the site with more complicated surrounding conditions, and it is often difficult to mount a sensor unless the lead wires derived from the sensor can be easily bent.

For this reason, there are increasing demands to provide lead wires that are low in electrical resistance and high in elasticity, flexibility, and tensile strength.

SUMMARY OF THE INVENTION

To overcome the above disadvantages of the conventional type lead wire, it is an object of the present invention to provide a lead wire for a sensor, which is low in electrical resistance, and high in flexibility, tensile strength and elasticity.

To attain the above object, the lead wire for a sensor according to the first aspect of the present invention introduces electric current for operating a sensor or transmits a signal obtained from the sensor. The lead wire comprises a conductor unit and a sheath unit to cover the conductor unit, whereby the conductor unit contains stainless steel wires and copper wires, and cross-sectional percentage of the stainless steel wires in the radial cross-section of the lead wire, excluding the sheath unit, is between 30–70%.

The most noteworthy feature of the present invention is that the lead wire comprises stainless steel wires and copper wires and that the cross-sectional percentage of the stainless steel wires in the radial cross-section of the lead wire, excluding the sheath unit, is between 30–70%. As the copper wires, for example, not only annealed copper wire as commonly used but also wires of a copper-containing alloy may be used. As the stainless steel wires, for example, SUS 304 soft wire may be used. In case the cross-sectional percentage of the stainless steel wires is less than 30%, tensile strength and elasticity of the lead wire are lower. On the contrary, if it is more than 70%, electrical resistance of the lead wire is higher.

Because the above lead wire comprises the copper wires and the stainless steel wires bundled together at an adequate ratio, it has excellent properties in as much as the lead wire combines the special features of these two types of wires.

Specifically, cross-sectional percentage of the stainless steel wires in the lead wire is 30 to 70%. As a result, the lead wire is low in electrical resistance and high in flexibility, tensile strength, elasticity, heat-resistance and anti-vibration property. Therefore, by using the lead wire with such properties for a sensor, the information from the sensor can be smoothly transmitted and operating conditions of the sensor can be kept in the best conditions. In this respect, the above lead wire is best suitable as the lead wire for sensor.

One preferred aspect of the invention involves arranging the stainless steel wires at the center of the lead wire, and placing the copper wires around the stainless steel wires (FIG. 1). In so doing, the lead wire provides satisfactory flexibility. When it is connected with terminals, contact resistance with the terminals can be reduced because of the contact with the copper having lower electrical resistance.

On the other hand, the copper wires may be arranged at the center of the lead wire, and the stainless steel wires may be placed around the copper wires (FIG. 4). It is also possible to have an irregular arrangement by arranging the stainless steel wires and the copper wires alternately (FIG. 5).

For this reason, in view of flexibility, it is preferable to adopt soft stainless steel wires having a hardness of 300 MHv (micro Vickers hardness) as the above stainless steel wires.

Further, the soft stainless steel wires are preferably obtained by heat treatment of hard stainless steel wires, which are normally used as lead wires. It is preferable that the heat treatment is performed at temperature of 1050° C. and the treatment time is 20 minutes. More specifically, the heat treatment may be effected by way of annealing with the highest temperature of 1050° C. for 20 minutes with reducing atmosphere in a furnace, for example under vacuum of $10^{-3}$ torr. By this heat treatment, crystal distortion of the soft stainless steel wire is corrected, and it exhibits a lower resistance value than the hard stainless steel wire.

It is a preferred aspect of the invention that stainless steel wires having a higher hardness than that of copper are arranged approximately at the center of the lead wire with the lowest bending curvature to obtain a lead wire having high flexibility and strength.

It is preferable that the copper wires are covered with antioxidant film. This improves durability of the lead wire. As the antioxidant film, for example, nickel- or tin-plated film is used. It is preferable that the above antioxidant film is 0.5 to 5 $\mu$m in thickness. If it is less than 0.5 $\mu$m in thickness, the antioxidant effect may be lower. On the other hand, if the thickness is more than 5 $\mu$m, the effect may be lower. On the other hand, if the thickness is more than 5 $\mu$m, it may result in higher cost.

The above lead wire is preferably coated with an insulating coating material. This makes it possible to keep good insulation between the lead wire and other components and also to increase heat-resistant property, wear-resistant property and anti-vulnerability of the lead wire. As the above coating material, the following materials may be preferably used: Teflon type resins having high heat-resistant property such as PTFE (poly-tetrafluoroethylene), PFA (tetrafluoroethylene/perfluoro-alkylvinylether copolymer), FEP (tetrafluoroethylene/hexa-fluoropropylene copolymer), etc.

Next, the lead wire for a sensor according to the second aspect of the present invention introduces electric current for operating a sensor or transmits information from a sensor, whereby the lead wire comprises stranded hybrid wires obtained by integrally molding or forming stainless steel and copper. The cross-sectional percentage of the stainless steel wires in each of the hybrid wires is 30 to 70% of a normal cross-section of each of the hybrid wires.

The second aspect of the invention is different from the first aspect in that hybrid wires obtained by integrally molding or forming copper and stainless steel are used instead of the copper wires and the stainless steel wires, which are independent from each other, in the first aspect of the invention.

It is preferable that the above hybrid wires are integrally molded or formed in such manner that the stainless steel is arranged over the copper. This arrangement makes it possible to prevent oxidation of copper and to improve durability. Also, the above hybrid wire may be integrally molded or formed so that the copper is placed over the stainless steel (FIG. 6). In this case, it is preferable to coat antioxidant film on the surface of the hybrid wire where copper is exposed. This improves durability of the lead wire. In the other features, it is the same as in the first aspect of the invention as described above.

BRIEF DESCRIPTION OF THE DRAWINGS

The features and the advantages of the present invention will become more apparent by the following detailed description in connection with the attached drawings in which.

DETAILED DESCRIPTION OF THE INVENTION

Figure 1:
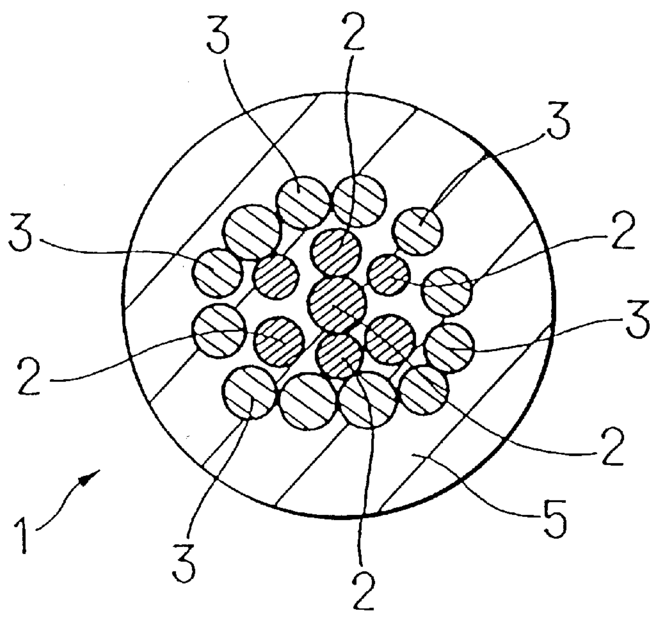
FIG. 1 is a cross-sectional view of a lead wire of a first embodiment of the present invention.

In the following, description will be given of preferred embodiments of the invention referring to the drawings.

1st Embodiment

Figure 2:
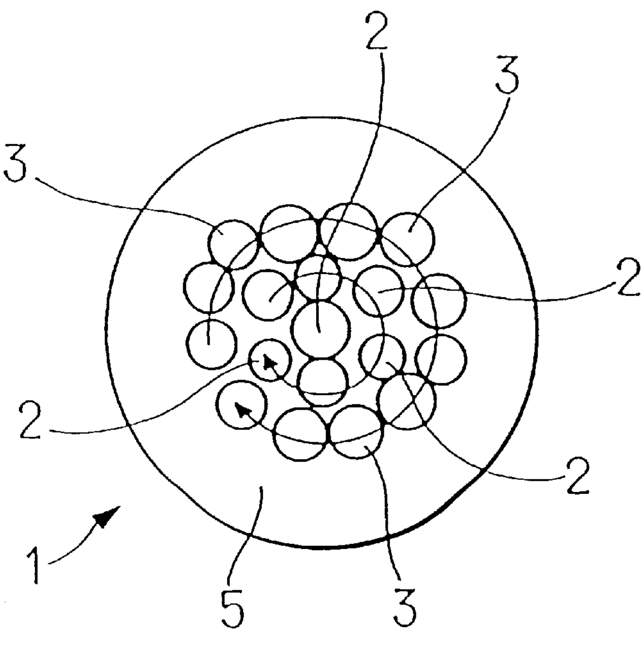
FIG. 2 is a view showing the direction of stranding stainless steel wires and copper wires respectively in the first embodiment.

Description will be given on the first embodiment of a lead wire for a sensor according to the present invention, referring to FIGS. 1 to 3. The first embodiment is a lead wire used for an oxygen concentration sensor. As shown in FIG. 1, the lead wire 1 comprises seven stainless steel wires 2 stranded at the center and twelve copper wires 3 arranged around them and stranded together to enclose the seven stainless steel wires at the center. The cross-section percentage of the stainless steel wires in the radial cross-section of the lead wire is 37%.

In the lead wire 1, the stainless steel wires 2 are arranged at the center, and copper wires 3 are set around the stainless steel wires 2. The lead wire 7 is coated with an insulating coating material 5. As the insulating coating material 5, for example, a Teflon type resin such as PTFE is used. As shown in FIG. 2, the lead wire 1 comprises one stainless steel wire 2 at the center and six stainless steel wires 2 arranged around it. Further, twelve copper wires 3 are stranded around the stainless steel wires in the same direction and in spiral form. Strand pitch of the six stainless steel wires 2 except the central wire is 14 mm (one turn for a length of 14 mm). Strand pitch of the twelve copper wires 3 is 14 mm.

As the material of the stainless steel wire 2, SUS 304 (soft SUS) is used. The stainless steel wire 2 is 0.2 mm in diameter. Annealed copper is used as the material of the copper wires 3. The copper wire 3 is 0.2 mm in diameter, and nickel-plated film (not shown) of 1 $\mu$m in thickness is coated as an antioxidant film on the surface of the copper wires. The insulating coating material 5 is 0.35 mm in thickness. The overall outer diameter of the lead wire 1 is 1.67 mm including the thickness of the insulating coating material 5. The thickness of the insulating coating material 5 may be 0.2 to 0.5 mm.

Figure 3:
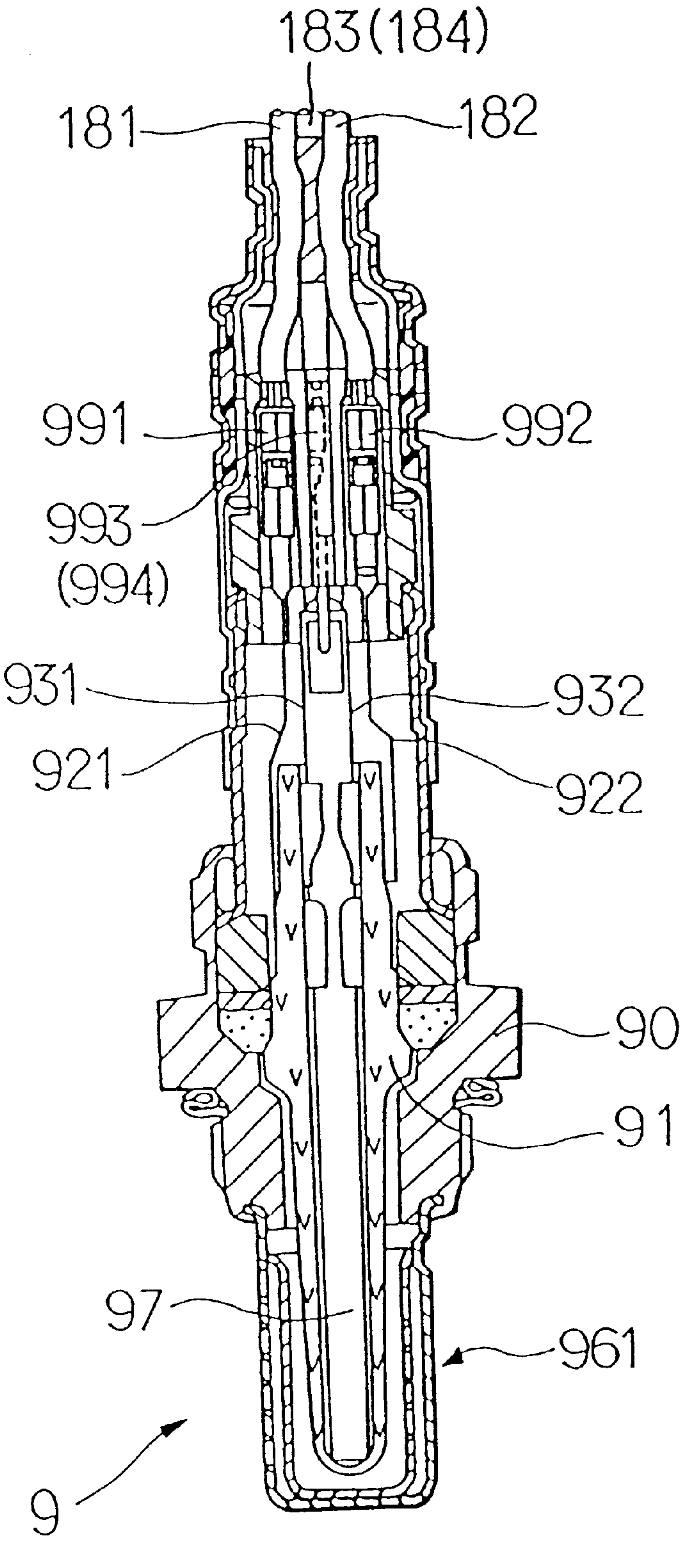
FIG. 3 is a cross-sectional view of an oxygen concentration sensor mounted with the lead wire of the first embodiment.

As shown in FIG. 3, four of the above lead wires 1 are used for an oxygen concentration sensor 9.

Specifically, two lead wires 1 are used as information pickup wires of an oxygen sensor element 91, and the other two lead wires are used as heater power wires for a heater 97, which is placed in the oxygen sensor element 91. Of the above four lead wires, lead wires 181 and 182 are the information pickup wires as described above and are connected to nickel terminals 991 and 992. On the other hand, the other lead wires 183 and 184 are the heater power wires and are connected to nickel terminals 993 and 994. The nickel terminals 991 and 992 for the oxygen sensor element are connected to an external electrode and an internal electrode of the oxygen sensor element 91 via internal leads 921 and 922. The nickel terminals 993 and 994 for the heater 97 are connected to the heater 97 via internal leads 931 and 932. The oxygen sensor element 91 is fixed on a housing 90, and its tip is provided with a cover 961 having an inlet for detection gas.

A bending test was performed on the above lead wires. In the bending test, the lead wire 1 is supported by two rollers each 20 mm in diameter, and a weight of 250 g is placed at lower tip of the lead wire. Under this condition, the lead wire positioned above the rollers is bent leftward and rightward until the lead wire is broken off. One bending to either leftward or rightward is counted as one in the number of bendings.

As the result of the bending test, the lead wire of the first embodiment was not broken off until the number of bendings reached 2,800 times. On the other hand, for comparison purpose, the same test was performed on a lead wire (cross-sectional percentage 16%; comparative example 1) comprising three stainless steel wires and sixteen copper wires and also on a lead wire (cross-sectional percentage 84%; comparative example 2) comprising sixteen stainless steel wires and three copper wires. As a result, the lead wire of the comparative example 1 was broken off when it was bent 1,300 times. The lead wire of the comparative example 2 was broken off when it was bent 5,300 times.

Next, tensile strength of the lead wire was determined. As the results of this test, the lead wire (cross-sectional percentage 37%) of the first embodiment showed tensile strength of 30 kgf. On the other hand, the lead wire of the above comparative example 1 had tensile strength of 21 kgf. Tensile strength of the comparative example 2 was 45 kgf. Next, electrical resistance of the lead wire of this embodiment was determined as 45 m Ω/m. Electrical resistance of the comparative example 1 (using copper wire) was 35 m Ω/m. When stainless steel wire was used (comparative example 2), electrical resistance was 165 Ω/m.

The results of the above measurement reveal that the lead wire of the first embodiment is low in electrical resistance and high in flexibility, tensile strength and elasticity. Accordingly, when the lead wire having such properties is used, information from the oxygen concentration sensor can be transmitted in smooth manner.

The lead wire of the first embodiment was used in the oxygen concentration sensor, however, while the application of the lead wire is not so limited. Rather, the lead wire is suitable for use in any type of sensors for detecting operating conditions of an internal combustion engine of an automobile, such as an A/F sensor, an exhaust air temperature sensor, etc. In case the lead wire is used in an A/F sensor, it is preferable that the six stainless steel wires around the central stainless steel wire and the twelve copper wires around the stainless steel wires are stranded in reverse directions in order to facilitate oxygen flow in the lead wire.

Figure 8:
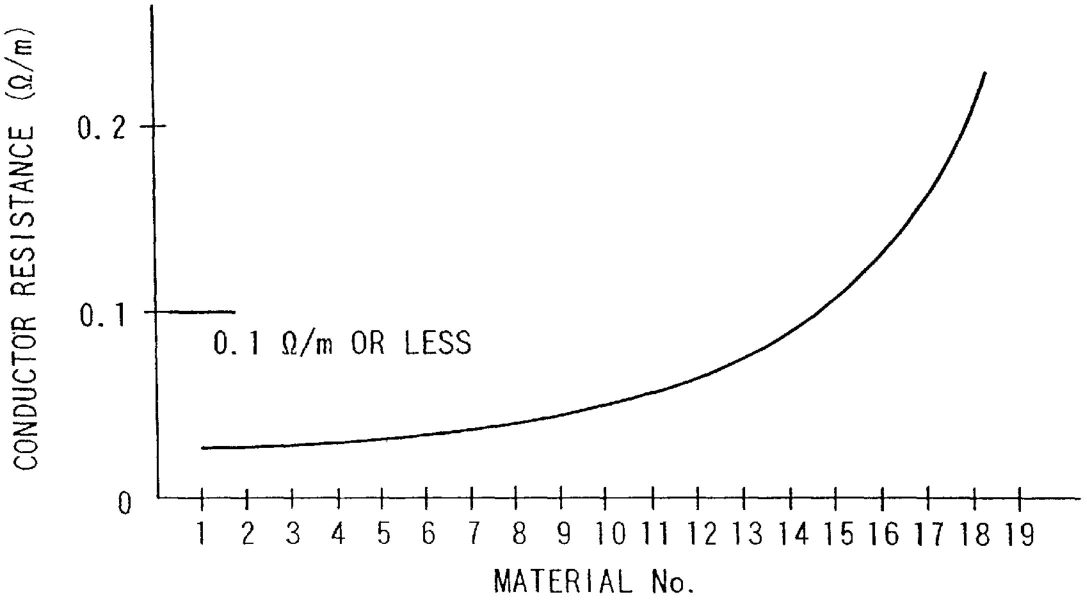
FIG. 8 is a graph showing conductor resistances of 20 different materials Nos. 1 to 20.
Figure 9:
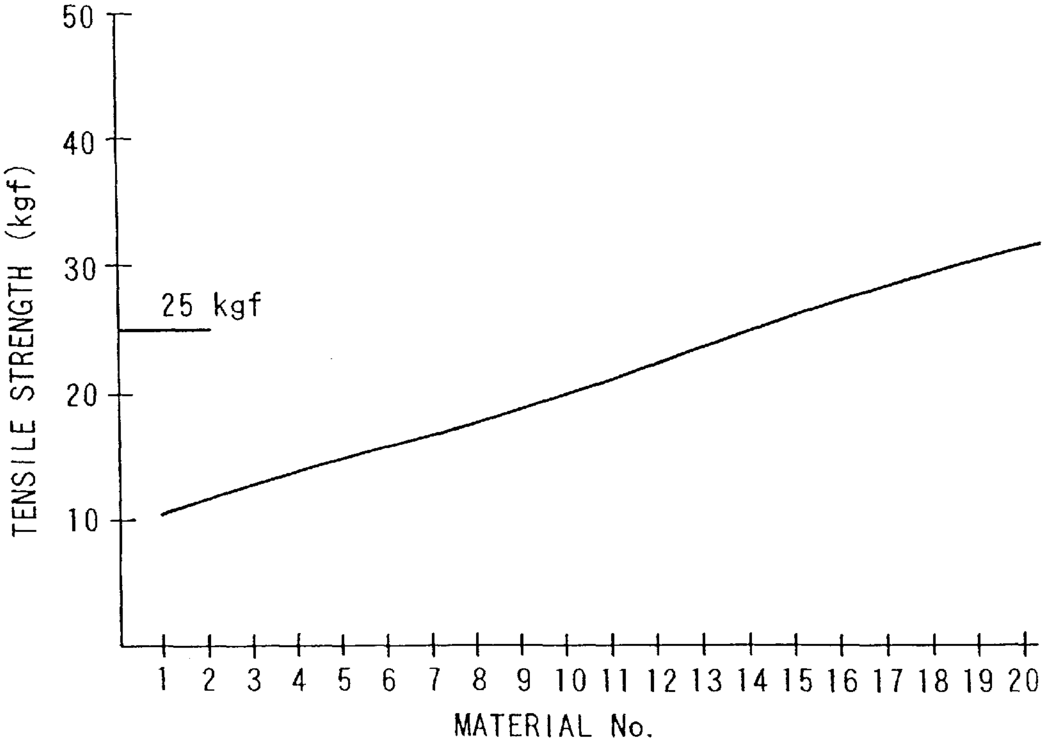
FIG. 9 is a graph showing tensile strength values of the 20 different materials Nos. 1 to 20.

Next, referring to FIGS. 8 and 9, the lead wire of the first embodiment is examined in detail to determine the effect of cross-sectional percentage of the stainless steel wires in radial cross-section, excluding the sheath unit, on the conductor resistance and tensile strength of the lead wire.

The materials Nos. 1 to 20 shown in FIGS. 8 and 9 have the data as summarized in Table 1. The numerical values shown in Table 1 represent number of wires.

Namely, the stainless steel wire and the copper wire of the present embodiment are 0.2 mm in diameter, and Teflon type insulating films are formed on the outer periphery.

The overall diameter of the lead wire is 1.67 mm.

TABLE 1

| Material No. | 1 | 2 | 3 | 4 | 5 | 6 | 7 | 8 | 9 | 10 |
|---|---|---|---|---|---|---|---|---|---|---|
| The number of stainless steel wires | 0 | 1 | 2 | 3 | 4 | 5 | 6 | 7 | 8 | 9 |
| The number of copper wires | 19 | 18 | 17 | 16 | 15 | 14 | 13 | 12 | 11 | 10 |
| Cross-sectional percentage (%) | 0 | 5 | 11 | 16 | 21 | 26 | 32 | 37 | 42 | 47 |

| Material No. | 11 | 12 | 13 | 14 | 15 | 16 | 17 | 18 | 19 | 20 |
|---|---|---|---|---|---|---|---|---|---|---|
| The number of stainless steel wires | 10 | 11 | 12 | 13 | 14 | 15 | 16 | 17 | 18 | 19 |
| The number of copper wires | 9 | 8 | 7 | 6 | 5 | 4 | 3 | 2 | 1 | 0 |
| Cross-sectional percentage (%) | 53 | 58 | 63 | 68 | 74 | 79 | 84 | 89 | 95 | 100 |

As it is evident from FIGS. 8 and 9, in the case in which the percentage of the stainless steel wires is less than 30%, tensile strength is lower than 25 kgf. For this reason, the lead wire is very weak, and it may be easily broken off when it is bent. In the case in which the percentage of the stainless steel wires is more than 70%, conductor resistance itself is very high, and it cannot be used as the lead wire for a sensor. In this respect, the percentage of the stainless steel wires should be between 30% and 70%.

2nd Embodiment

Figure 4:
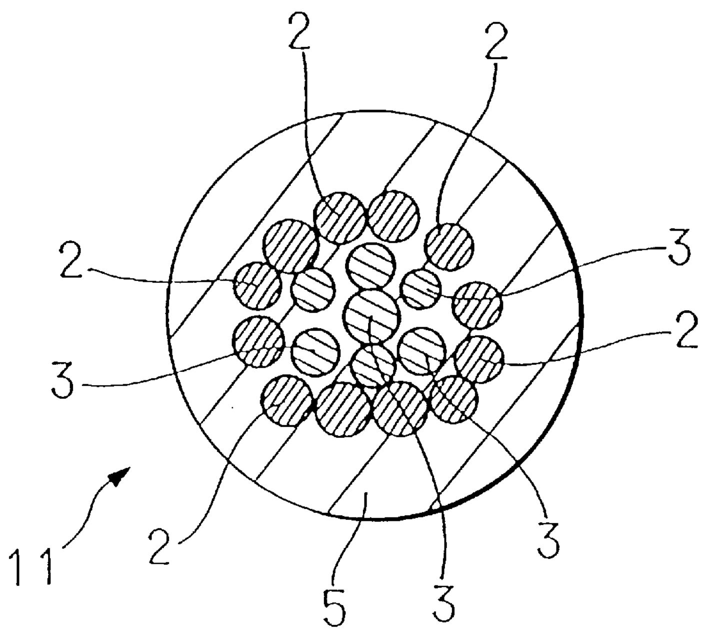
FIG. 4 represents a cross-sectional view of a lead wire of a second embodiment of the invention.

As shown in FIG. 4, the lead wire of the second embodiment comprises seven copper wires 3 at the center and twelve stainless steel wires 2 arranged around the copper wires. Each of the copper wires 3 and the stainless steel wires 2 is 0.2 mm in diameter. On the surface of the copper wires 3, nickel-plated film of 1 μm in thickness is coated (not shown). Cross-sectional percentage of the stainless steel wires in the radial cross-section of the lead wire 11 is 63%. The other features are the same as in the first embodiment.

In the second embodiment, the same effect as in the first embodiment can be obtained.

3rd Embodiment

Figure 5:
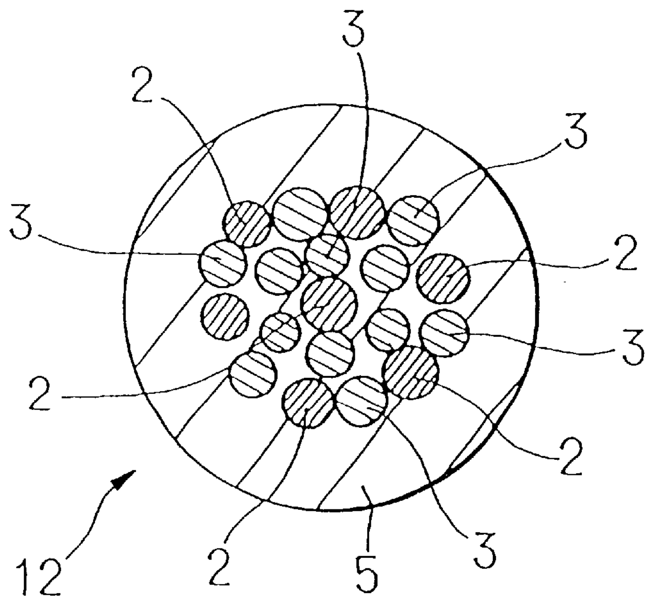
FIG. 5 is a cross-sectional view of a lead wire of a third embodiment of the invention.

As shown in FIG. 5, the lead wire of the third embodiment comprises seven stainless steel wires 2 and twelve copper wires 3 stranded alternately. Each of the stainless steel wires 2 and the copper wires 3 is 0.2 mm in diameter. The cross-sectional percentage of the stainless steel wires 2 in the radial cross-section of the lead wire 12 is 37%.

In other respects, the lead wire of the third embodiment is the same as the first embodiment.

In the third embodiment, the same effects as in the first embodiment can be obtained.

4th Embodiment

Figure 6:
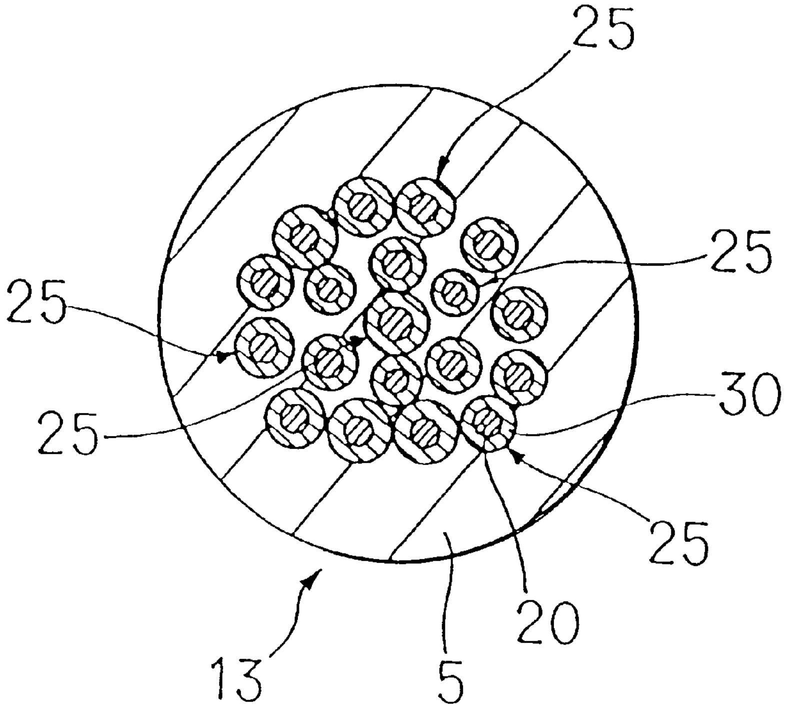
FIG. 6 is a cross-sectional view of a lead wire of a fourth embodiment of the invention.
Figure 7:
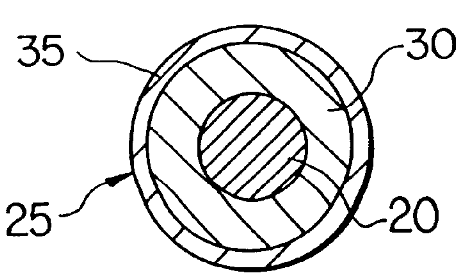
FIG. 7 is a cross-sectional view of a hybrid wire in the fourth embodiment of the invention.

As shown in FIGS. 6 and 7, the lead wire of the fourth embodiment comprises nineteen hybrid wires 25 bundled together, which are obtained by integrally molding or forming stainless steel 20 and copper 30. As shown in FIG. 7, each hybrid wire 25 comprises the stainless steel 20 at the center and the copper 30 arranged over the stainless steel 20. The hybrid wire is produced by integrally molding or forming the stainless steel and the copper in the same quantity. The cross-sectional percentage of the stainless steel 20 in the radial cross-section of the lead wire 13 is 50%.

The surface of the hybrid wire 25 where copper is exposed is coated with nickel-plated film 35 (1 μm in thickness)(FIG. 7), which is an antioxidant film.

In other respects, the lead wire of the fourth embodiment is the same as the first embodiment. In the fourth embodiment, the same effects as in the first embodiment can be obtained.

5th Embodiment

Description is now given on hardness of the stainless steel wire in the lead wire of the fifth embodiment of the present invention. The hardness of the stainless steel wire of the lead wire is preferably not more than 300 MHv. If the hardness is higher than 300 MHv, the rigidity of the lead wire itself becomes extremely high, and this causes inconveniences in mounting or removal of the lead wire to or from the sensor.

To determine the hardness of the lead wire of the present invention, the lead wire was embedded in resin and it was cut off along its cross-section. Then, hardness was determined using a micro Vickers hardness tester by pressing diamond indenter. The hardness of the lead wire of the present invention was approximately equal to the hardness of hard stainless steel wire after heat treatment at 1050 ° C. for 20 minutes.

In the above embodiments, the lead wire can be used not only for picking up information but also as the lead wire for a heater of an oxygen concentration sensor provided with a heater. In particular, it is effective when it is used as the lead wire for a heater having low resistance values to achieve earlier activation of the oxygen concentration sensor. Namely, in the heater having a lower resistance value, if a conventional type lead wire having high resistance value is adopted, it is not possible to apply the predetermined voltage on the heater and may cause inconvenience in activation time of the oxygen concentration sensor.

Figure 10:
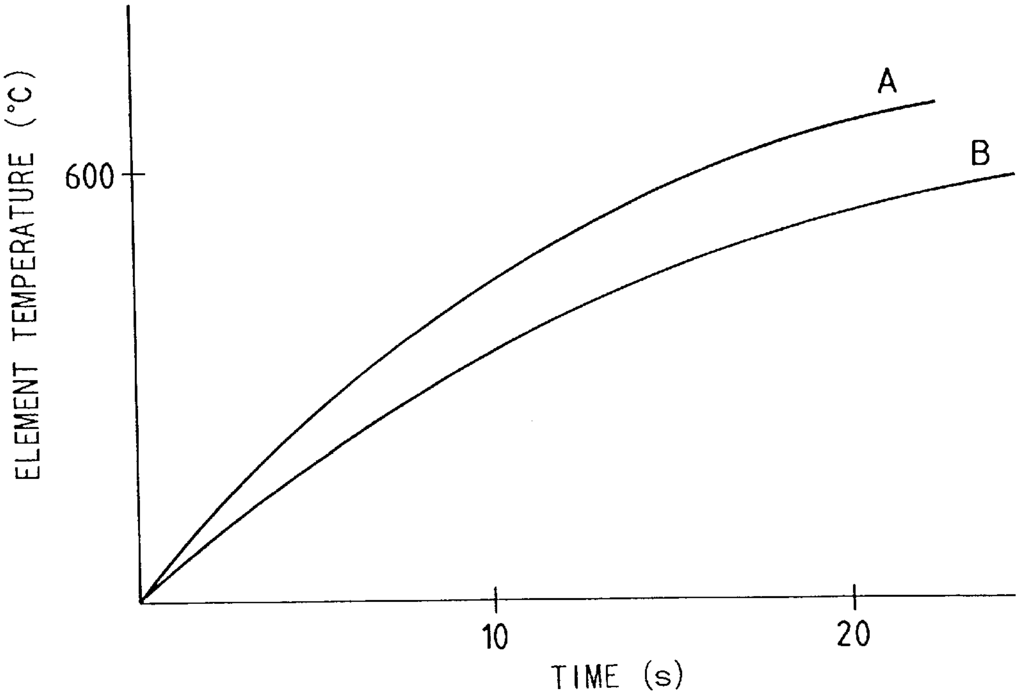
FIG. 10 is a graph showing temperature variation with respect to time when an $O_2$ sensor using lead wires according to the present invention is used and when a comparative example sensor is used.

In contrast, the lead wire of the present invention has a lower resistance value as shown in FIG. 10, and the oxygen concentration sensor can be activated earlier. FIG. 10 shows temperature variation with respect to time when an oxygen sensor mounted on a 2000 cc engine is used. As the heater, a silicon nitride heater ($R_{20}$=1.1 Ω provided with tungsten carbide was used. In FIG. 10, a curve A is obtained when Material No. 8 of Table 1 is used as the present invention, and a curve B is obtained when Material No. 16 of Table 1 is used as a comparative example.

As described above, it is possible according to the present invention to provide a lead wire for a sensor, which is low in electrical resistance and high in flexibility, tensile strength and elasticity.

What is claimed is:

1. An oxygen concentration sensor for detecting oxygen concentration in an exhaust gas from an automobile, comprising:

a housing;

a sensor element fixed in said housing for detecting oxygen concentration in said exhaust gas with a front end thereof being exposed to said exhaust gas;

a metal cover fixed to said housing for covering the other end of said sensor element;

a rubber bussing attached to a through-hole made in at least one portion of said metal cover; and a lead wire electrically connected to said sensor element and lead out to outside through said rubber bussing, said lead wire having a conductor unit and a sheath unit to cover said conductor unit, said conductor unit having stainless steel wires and copper wires, wherein a cross-sectional percentage of said stainless steel wires in radial cross-section of said lead wire, excluding said sheath unit is between 30% and 70%.

2. An oxygen concentration sensor according to claim 1, wherein said stainless steel wires have a hardness of 30 MHv.

3. An oxygen concentration sensor according to claim 1, wherein said stainless steel wires are arranged approximately at a center of said lead wire, and further wherein said copper wires are arranged around aid stainless steel wires.

4. An oxygen concentration sensor according to claim 1, wherein said stainless steel wires and copper wires are stranded together.

5. An oxygen concentration sensor for detecting oxygen concentration in an exhaust gas from an automobile, comprising:

a housing;

a sensor element fixed in said housing for detecting oxygen concentration in said exhaust gas with a front end thereof being exposed to said exhaust gas;

a metal cover fixed to said housing for covering the other end of said sensor element;

a rubber bussing attached to a through-hole made in at least one portion of said metal cover; and a lead wire electrically connected to said sensor element and lead out to outside through said rubber bussing, said lead wire having a conductor unit and a sheath unit to cover said conductor unit, said conductor unit having hybrid wires stranded together, said hybrid wires having stainless steel and copper integrally molded or formed together, and wherein cross-sectional percentage of said stainless steel in each of said hybrid wires is between 30% and 70% of a radial cross-section of said hybrid wires.

6. An oxygen concentration sensor according to claim 5, wherein each of said hybrid wires is coated with an antioxidant film on the surface thereof where said copper is exposed.

* * * * *